No. 642,662. Patented Feb. 6, 1900.
A. U. ALCOCK.
APPARATUS FOR ELECTRICALLY TRANSMITTING ORDERS OR SIGNALS.
(Application filed Jan. 6, 1899.)
(No Model.) 3 Sheets—Sheet 1.
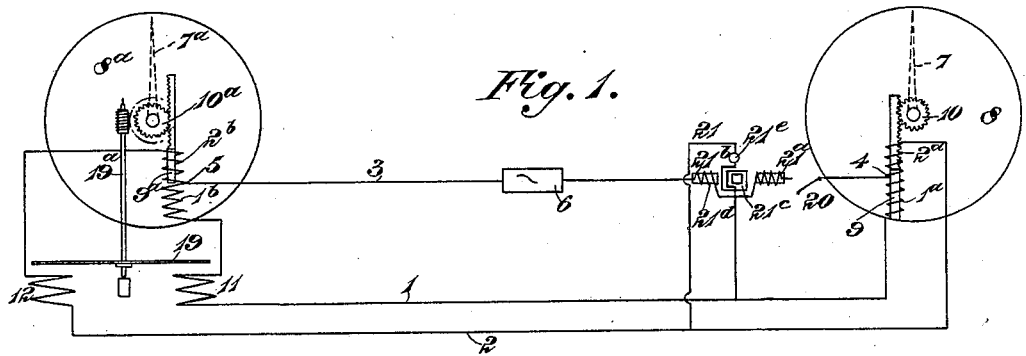
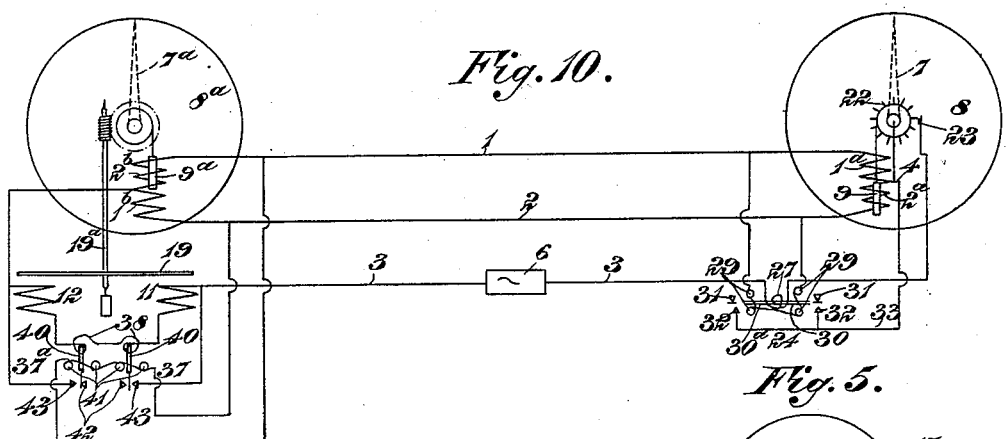
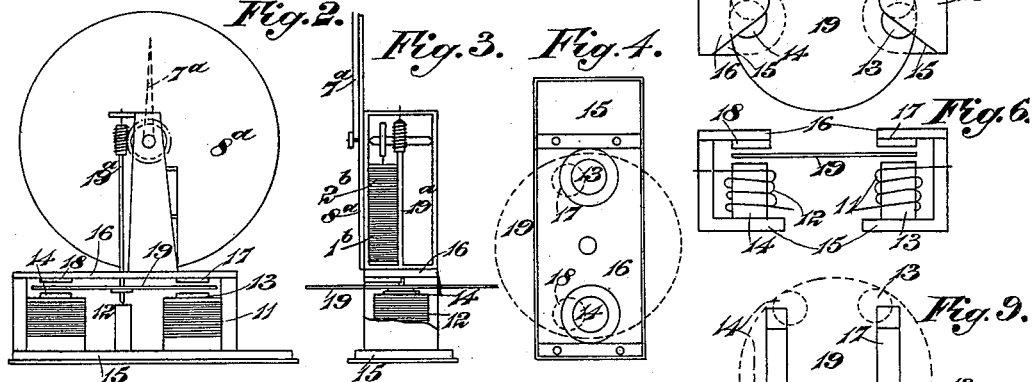
Witnesses:
C. L. Belcher
Wm. H. Capel.
Inventor
Alfred U. Alcock
By H. C. Townsend
Attorney
THE NORRIS PETERS CO., PHOTO-LITHO., WASHINGTON, D. C.

No. 642,662. Patented Feb. 6, 1900.
A. U. ALCOCK.
APPARATUS FOR ELECTRICALLY TRANSMITTING ORDERS OR SIGNALS.
(Application filed Jan. 6, 1899.)
(No Model.) 3 Sheets—Sheet 2.
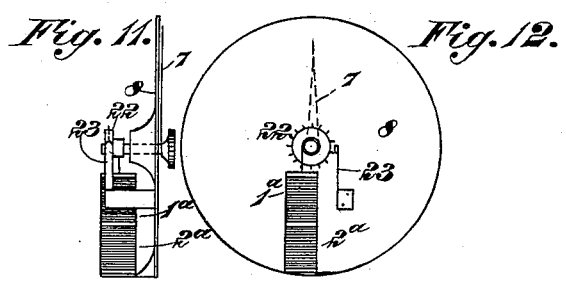
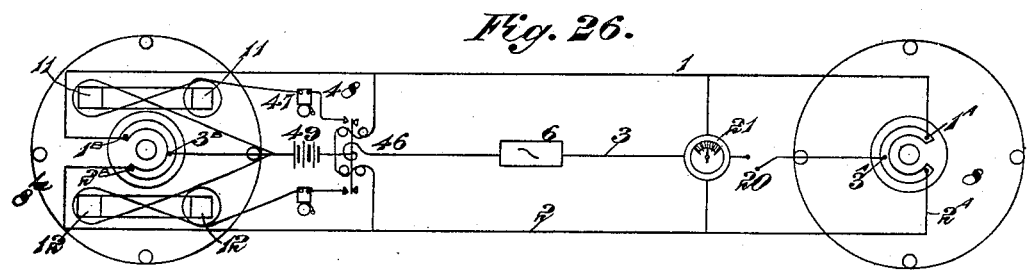
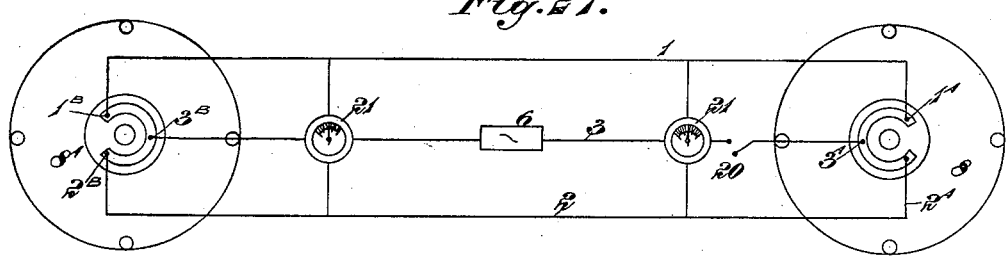
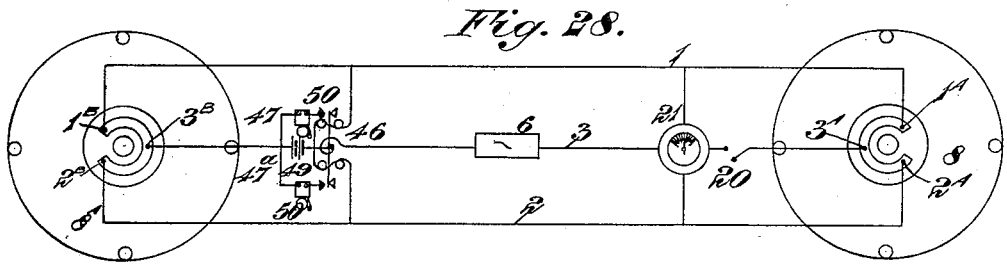
Witnesses:
C. L. Belcher
Wm. H. Capel
Inventor
Alfred U. Alcock
By
H. C. Townsend
Attorney No. 642,662. Patented Feb. 6, 1900.
A. U. ALCOCK.
APPARATUS FOR ELECTRICALLY TRANSMITTING ORDERS OR SIGNALS.
(Application filed Jan. 6, 1899.)
(No Model.) 3 Sheets—Sheet 3.
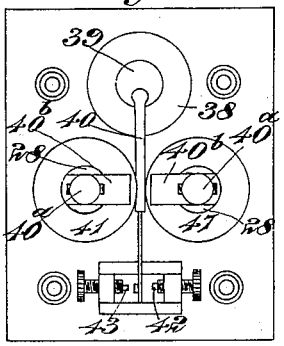
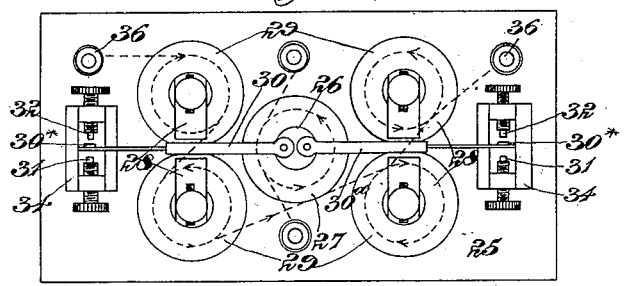
Witnesses:
C. L. Belcher
Wm. H. Capel
Inventor
Alfred U. Alcock
By H. C. Townsend Attorney
THE NORRIS PETERS CO., PHOTO-LITHO., WASHINGTON, D. C.

UNITED STATES PATENT OFFICE.

ALFRED UPTON ALCOCK, OF LONDON, ENGLAND.

APPARATUS FOR ELECTRICALLY TRANSMITTING ORDERS OR SIGNALS.

SPECIFICATION forming part of Letters Patent No. 642,662, dated February 6, 1900.

Application filed January 6, 1899. Serial No. 701,304. (No model.)

*To all whom it may concern:*

Be it known that I, ALFRED UPTON ALCOCK, a subject of the Queen of Great Britain and Ireland, residing at the city of London, England, have invented a Method of and Apparatus for Electrically Transmitting Orders or Signals, suitable for use as a ship's telegraph and the like, (for which an application for patent has been filed in Great Britain November 24, 1898, No. 24,855,) of which the following is a specification.

This invention relates to improvements in that kind of apparatus for transmitting orders or signals—as, for example, from the bridge of a steamship to the engine-room or from the conning-tower of a war-ship to the gun-turrets—wherein the orders or signals, hereinafter called "orders," are transmitted electrically from one place to another by disturbing at the transmitting-station by movement of a transmitting-indicator the balance between two normally-balanced circuits or two parts of a divided circuit, hereinafter called the "two circuits," traversed by electric currents, and restoring at the receiving-station by movement of the receiving-indicator the balance between the two circuits, so that the order given by the receiving-indicator will then correspond to that given by the transmitting-indicator.

For transmitting orders in the manner set forth according to this invention there are used, in conjunction with the two circuits, means for causing periodically-varying electric currents to traverse the same, a transmitting instrument, hereinafter called the "transmitter," comprising an indicator arranged to move over a suitable dial and a circuit-disturber connected to the indicator and adapted to vary the condition of the two circuits at the transmitting end thereof, and a receiving instrument, hereinafter called the "receiver," comprising an indicator arranged to move over a suitable dial and a circuit-balancer adapted to restore the balance in the condition of the two circuits at the receiving end thereof. The receiver-indicator may be operated automatically or by hand. To operate it automatically, the receiver may be provided with an electromagnetic device or motor controlled by the two circuits and having an armature or rotary body connected to the indicator and circuit-balancer of the receiver. The arrangement in this case is such that when the indicators of the transmitter and receiver are at rest the two circuits are balanced and the electromagnetic device is inoperative on the armature; but when the indicator of the transmitter is moved from or toward the zero position it will cause the circuit-disturber to disturb the balance between the two circuits and so enable the electromagnetic device to rotate the armature in such a way as to cause the indicator of the receiver to follow the movement of the indicator of the transmitter and at the same time cause the circuit-balancer to restore the balance between the two circuits, as set forth, at which time the indicator of the receiver will give the same order as the indicator of the transmitter.

In the accompanying illustrative drawings, Figure 1 is a diagram showing one arrangement of apparatus according to this invention. Figs. 2 and 3 are elevations at right angles to each other, and Fig. 4 a part plan showing a receiver suitable for use in such an arrangement. Figs. 5 and 6 show, respectively in plan and side elevation, a modified construction of inductor apparatus. Figs. 7 and 8 are elevations at right angles to each other, and Fig. 9 is a plan showing a further modified construction of induction apparatus. Fig. 10 is a diagram showing another arrangement of apparatus according to this invention. Fig. 11 and 12 are elevations at right angles to each other, showing the transmitter represented in Fig. 10. Figs. 13 and 14 show, respectively in plan and elevation, a two-way polarized relay. Figs. 15 and 16 show, respectively in plan and end elevation, a single-way polarized relay. Fig. 17 is a diagram showing a modified arrangement of apparatus. Figs. 18 and 19 show, respectively in plan and vertical section, the transmitter used in this arrangement. Figs. 20 and 21 show, respectively in plan and side elevation, the indicator and a movable electrode used in such transmitter. Figs. 22 and 23 show, respectively in plan and vertical section, the receiver shown in Fig. 17. Figs. 24 and 25 show, respectively in plan and side elevation, the indicator and circuit-balancer shown in Figs. 22 and 23. Figs. 26, 27, and 28 are diagrams showing further-modified arrangements of the apparatus.

In Fig. 1, 1 and 2 are two conductors connected together and to third conductor 3 at the points 4 and 5, so as to form a divided circuit having a common return.

6 is an electric generator capable of producing a periodically-varying electric current of an alternating, undulating, intermittent, pulsating, or other like nature.

7 is the indicator of the transmitter, arranged to revolve over a dial 8, upon which are marked the orders to be transmitted—for example, "Ahead," "Astern," "Stop," and so on.

$1^a$ and $2^a$ are two similar inductance-coils arranged in series with the two conductors 1 and 2, respectively, at the transmitting end and provided with a movable iron core 9, connected to the indicator 7, as by a brass rack and pinion 10, so that the indicator and core will move together. The coils $1^a$ and $2^a$, with core 9, form a circuit-disturber.

$7^a$ is the indicator, and $8^a$ the dial, of the receiver, the said dial having orders marked thereon corresponding to those on the dial 8.

$1^b$ and $2^b$ are two similar inductance-coils arranged in series with the two conductors 1 and 2, respectively, at the receiving end and provided with a movable iron core $9^a$, connected to the indicator $7^a$, as through a brass rack and pinion $10^a$, so that the two will move together. The coils $1^b$ and $2^b$, with iron core $9^a$, form a circuit-balancer.

11 and 12 are two similar solenoids arranged in series with the conductors 1 and 2, respectively, and provided with laminated iron cores 13 and 14, Figs. 2, 3, and 4, so as to form two similar and equal inductors. The two solenoids 11 and 12, with cores, are fixed upon a base or stand 15, which may be of iron, so as to be at opposite sides of the center thereof, with the cores 13 and 14 parallel to one another, and above them is fixed an iron plate 16, provided on its under side with iron projections 17 and 18, which are located a short distance from the upper ends of the cores and a little out of line therewith, (see Fig. 4,) so that lines of force passing between the upper end of each core and the corresponding iron projection will take an inclined direction. Arranged to freely rotate between the cores 13 and 14 and iron projections 17 and 18 is a plate 19, of metal—for example, aluminium—upon which the magnetic fields produced by periodically-varying electric currents traversing the two solenoids 11 and 12 will act inductively in such a way that the plate will be caused to rotate in one direction by a current traversing one solenoid and in the opposite direction by a current traversing the other solenoid and that when the two circuits are balanced and the rotative force of the two currents flowing through the two solenoids are consequently equal the plate 19 will come to rest or will remain at rest.

The bottom and top plates 15 and 16 of the inductor apparatus may be divided into two separate parts, as shown in Figs. 5 and 6. Also each inductor-core may be made ⊔ shape, as shown in Figs. 7, 8, and 9, so that it has two ends acting upon the plate 19. 20, Fig. 1, is a switch by which the two circuits can be simultaneously closed.

With the arrangement described when the indicator 7 is turned to send an order it simultaneously alters the position of the iron core 9 in the two coils $1^a$ $2^a$, and thereby alters the inductance of the two circuits 1 3 and 2 3. The balance between the rotative action of the currents in the two circuits on the plate 19 of the inductor apparatus being thus destroyed, the plate 19 and its spindle $19^a$ will be rotated in one direction or the other and by acting upon the core $9^a$ of the solenoids $1^b$ $2^b$ will automatically vary the inductance of the two circuits until a balance between the rotative action of the currents traversing the two circuits is reëstablished, whereupon the movable parts will come to rest and the position of the indicator $7^a$ of the receiver will correspond with that of the indicator 7 of the transmitter.

Near to the transmitter may be arranged at 21 an electrodynamometer containing iron cores $21^a$ $21^b$, which need not necessarily be laminated, its movable coil $21^c$ being connected up between the conductors 1 and 2 and its fixed coil or coils $21^d$ in series with the conductor 3. $21^e$ is the indicator of the dynamometer. This arrangement of dynamometer has for its object to provide a means of indicating to the operator that the indicator $7^a$ of the receiver corresponds with that of the transmitter, which he knows will be the case when the indicator of the dynamometer is at zero, indicating that the two circuits are balanced.

Instead of a dynamometer there may be used a periodically-polarized relay adapted to operate an electric bell and cause it to ring until the balance between the two circuits is reëstablished, as hereinafter described with reference to Fig. 28.

In Fig. 10 each of the iron cores 9 $9^a$ is connected by a cord to a pulley on the spindle of the corresponding indicator 7 or $7^a$. On the spindle of the indicator 7 is fixed a pin-wheel 22, near to which is a spring 23, connected to the conductor 3.

At 24 is a two-way periodically-polarized relay, which, as shown in Figs. 13 and 14, comprises an iron base-plate 25, provided with an iron core 26, surrounded by and connected to a polarizing-coil 27 in series with the conductor 3, and also with four iron cores 28, surrounded by deflecting-coils 29, arranged in a shunt between the conductors 1 and 2.

30 and $30^a$ are two soft-iron tongues pivoted to the core 26, so as to be polarized thereby, and arranged to swing between pairs of pole-pieces $28^a$, extending from the cores 28. Each tongue is provided at its free end with a platinum contact 30<sup>x</sup>, that works between an adjustable agate stop 31 and an adjustable contact-screw 32, which is electrically connected through a conductor 33, Fig. 10, to the coils $1^a$ $2^a$ at the point 4 and to the pin-wheel 22. 34 34 are non-magnetic frames secured to ebonite pillars 35 and carrying the stops 31 and contacts 32. 36 are terminal screws.

At 37 37$^a$, Fig. 10, are two single-way periodically-polarized relays. Each of these relays comprises, as shown in Figs. 15 and 16, a polarizing-coil 38, connected to its iron core 39, to which the armature 40 is pivoted, so as to be polarized thereby, and two deflecting-coils 41, provided with cores 40$^a$ and pole-pieces 40$^b$, between which the polarized armature 40 works. The polarizing-coils 38 of the two single-way relays at 37 and 37$^a$ are arranged in series with each other and with the inductor-solenoids 11 and 12, which are arranged in series with each other and with the conductor 3. The deflecting-coils 41 of the two relays at 37 and 37$^a$ are arranged in series with each other and in a shunt across the conductors 1 and 2. The polarized armatures 40 are each arranged to work between an adjustable agate stop 42 and an adjustable contact 43, one of the contacts 43 being connected to the conductor 3 at one side of the inductor-solenoids 11 and 12 and the other to the said conductor at the opposite side of the said solenoids, as shown. In other respects the arrangement is similar to that shown in Fig. 1 and works as follows:

When the parts are in the positions shown in Fig. 10, the two circuits are open at spring 23 and their inductance is equal. Upon moving the transmitter-indicator 7 it rotates the pin-wheel 22 and causes the pins thereon to come successively into contact with the spring 23, so as to complete in an intermittent manner the two circuits through the polarizing-coils 27 and 38 of the relays at 27, 37, and 37$^a$. At the same time the indicator 7 moves the core 9 and alters the inductance of the two circuits, the pin-wheel 22, when the indicator is over the order to be sent, being in a position in which it is out of contact with the spring 23. Each time the circuits are completed by the pin-wheel currents pass in one direction or the other through the deflecting-coils 29 of the relay at 24 and cause one or other of the tongues 30 or 30$^a$ to connect the conductor 3 direct to the coils $1^a$ $2^a$ through the conductor 33. Currents also pass in one direction or the other through the deflecting-coils 41 of the relays at 37 37$^a$, whereby one or other of the armatures 40 of such relays acts to short-circuit one or other of the inductors 11 or 12 and allow the other, through the rotary-plate 19 and gearing 10$^a$, to adjust the position of the indicator 7$^a$ of the receiver to agree with that of the transmitter and at the same time operate the circuit-balancer to reëstablish a balance between the two circuits. When this takes place, the circuits will be automatically opened by the relay at 24.

The circuit-disturber and circuit-balancer can be variously modified. Thus each pair of coils 1$^a$ 2$^a$ and 1$^b$ and 2$^b$, instead of being provided with a movable iron core, as described, may be provided with a fixed iron core and a movable closed coil that may be arranged to move between the pair of coils and its core or outside the coils for the purpose of varying the inductance of the two circuits.

In Figs. 17 to 25 the circuit-disturber comprises a liquid-resistance, to which the conductors 1 and 2 are connected by electrodes 1$^A$ 2$^A$, respectively, and to which the conductor 3 is connected by a movable electrode 3$^A$, carried by a disk 7$^A$. This disk is provided with the indicator 7, arranged to move over a dial 8, forming the top of a box 8$^A$, inclosing a block 44 of non-conducting material, such as vulcanite, which is formed with a partly-circular cell 45, in which the liquid-resistance is placed, and with a bearing for the disk. The circuit-controller also comprises a liquid-resistance connected to the conductors 1, 2, and 3 by electrodes 1$^B$, 2$^B$, and 3$^B$, respectively, the electrode 3$^B$ and indicator 7$^a$ being carried by the rotary plate 19 of the inductor apparatus, which, as shown, is inclosed in the box 8$^B$, which also incloses the block 44$^B$, formed with the liquid-containing cell 45$^B$. In this case it is preferred that the current should be of an alternating character. The liquid used is preferably one giving a high resistance—for example, ordinary or distilled water. The electrodes are preferably of platinum. As will be understood, by moving the transmitter-indicator 7 the resistance of the two circuits, which are normally balanced, will be altered, with the result that one or other of the inductors 11 or 12 will cause the plate 19 to move the electrode 3$^B$ into a position to again make the resistance of the two circuits equal and to move the receiver-indicator 7$^a$ into a position corresponding for the time being to that of the transmitter-indicator 7.

Fig. 26 shows a modified arrangement in which instead of utilizing the difference between the currents flowing through the two circuits to directly actuate the inductors 11 12 there is employed, as shown at 46, a periodically-polarized two-way relay of the kind shown in Figs. 13 and 14, connected across the two conductors 1 and 2 and adapted to alternately connect up one inductor or the other through a local circuit 47 or 47$^a$, wherein intermittent currents are set up by the action of an electric bell or vibrator 48, contained in the circuit of each inductor, the source of energy being derived from an electric battery 49. The intermittent currents thus set up in the winding of the inductor 11 or 12 will cause the metal disk 19, which is connected to the electrode 3$^B$, to be rotated in one direction or the other until the balance between the two circuits is reëstablished in the manner already described, whereupon the relay opens the local circuits.

Fig. 27 shows a modification in which instead of effecting the movement of the receiver-indicator 7ᵃ automatically, as hereinbefore described, it may be effected by hand, the movement being continued until the pointer of an electrodynamometer at 21, connected up as illustrated, shows that the two circuits are balanced.

Instead of using a dynamometer there may be provided near to the receiver, as shown in Fig. 28, a periodically-polarized two-way relay, such as hereinbefore described, adapted when the balance between the two circuits is disturbed to come into action in the well-known way and complete one or other of two local circuits 47 or 47ᵃ, that includes a battery 49 and an electric bell 50, and cause one or other of the said electric bells 50, according to the direction in which the indicator of the transmitter is moved, to ring until the receiver-indicator is moved by hand into a position to reëstablish a balance between the two circuits, which will be indicated by the bell ceasing to ring. The circuit-disturber and circuit-balancer in each of the arrangements Figs. 26, 27, and 28 may be of either of the kinds hereinbefore described. They are shown as liquid-resistances with movable electrodes; but they may be inductance-coils with iron cores, as hereinbefore described.

The periodically-varying electric currents may be variously produced. It may be by an alternating-current generator, by a battery and an ordinary vibrating bell, by a motor-transformer, or by an ordinary inductor-transformer having its secondary winding connected up with the two circuits.

As will be obvious, one transmitter may be used to simultaneously transmit orders to two or more places, the circuit-disturber of each pair of circuits being arranged to be simultaneously operated from the indicator of the transmitter.

What I claim is—

1. Apparatus for electrically transmitting orders or signals comprising two normally-balanced electrical circuits, means adapted to set periodically-varying electrical currents in said circuits, a circuit-disturber located at the transmitting-station, an indicator adapted when moved, to operate said circuit-disturber and destroy the balance between said circuits, a circuit-balancer located at the receiving-station and adapted by movement to restore the balance between said circuits when the same has been disturbed, a receiver-indicator connected to said circuit-balancer, and an electromagnetic device comprising a rotary body adapted to operate said circuit-balancer and two similar inductors that are arranged at opposite sides of the center of motion of said body so as to be inoperative on said body when the circuits are balanced, but one or other of which when the circuits are unbalanced will act to turn said body in one direction or the other and operate the movable portion of said circuit-balancer in a direction to balance said circuits, substantially as described.

2. Apparatus for electrically transmitting orders or signals comprising two normally-balanced electrical circuits, means adapted to set periodically-varying electrical currents in said circuits, a circuit-disturber located at the transmitting-station, an indicator adapted when moved to operate said circuit-disturber and destroy the balance between said circuits, a circuit-balancer located at the receiving-station and adapted by movement to restore the balance between said circuits when the same has been disturbed, a receiver-indicator connected to said circuit-balancer, and an indicator device comprising two similar solenoids or sets of solenoids connected to said circuits and having iron cores, an iron plate fixed above said cores and having projections located a short distance from but a little out of line therewith, and a metal plate mounted to rotate between the adjacent ends of said cores and projections and connected to the movable portion of said circuit-balancer, substantially as described.

3. In apparatus for transmitting orders or signals, the combination with normally-balanced electrical circuits and order or signal indicating mechanism at the receiving end of said circuits, of means adapted to set up periodically-varying electric currents in said circuits, and a circuit-controller comprising a cell containing liquid and fixed and movable electrodes located in said liquid and connected to said circuits and means for moving the fixed and movable electrodes relatively to each other, substantially as described.

4. Apparatus for transmiting orders or signals comprising two normally-balanced electric circuits, means adapted to set up periodically-varying electric currents in said circuits, a circuit-disturber located at the transmitting end and comprising fixed and movable electrodes connected to the ends of the circuit-conductors an electrolyte-cell in which said electrodes are located, and an indicator connected to the movable electrode, means located at the receiving ends of said circuits and whereby the balance can be restored, and an indicator connected to the means for restoring the balance between said circuits substantially as described.

5. Apparatus for electrically transmitting orders or signals comprising two normally-balanced electrical circuits, means adapted to set up in said circuits periodically-varying electric currents, a circuit-disturber located at the transmitting-station and comprising a cell charged with liquid, fixed and movable electrodes connected to the circuit-conductors at the transmitting end, and located in the liquid in such cell, a circuit-balancer located at the receiving end of said circuits and adapted by movement to restore the balance between said circuits when the same has been disturbed, a receiver-indicator connected to said circuit-balancer, and an inductor device comprising a rotary body connected to said circuit-balancer and two normally-balanced inductors connected to said circuits and arranged to act inductively in said body and rotate it in one direction or the other when the balance between the circuits is destroyed and to be inoperative on said body when the balance is restored, substantially as described.

6. Apparatus for transmitting orders or signals comprising three conductors extending from one station to another, a cell charged with a high-resistance liquid located at each station, two fixed electrodes connected to the ends of two of the conductors at each station and located in the liquid in the cells at said stations a movable electrode connected to each end of the third conductor and located between the fixed electrode of the cell at the corresponding station, indicators in connection with said movable electrodes, and an alternating-current generator located in said third conductor substantially as described.

7. Apparatus for transmitting orders or signals comprising three conductors extending from one station to another, a cell charged with a high-resistance liquid located at each station, two fixed electrodes connected to the ends of two of the conductors at each station and located in the liquid in the cells at said stations, a movable electrode connected to each end of the third conductor and located between the fixed electrode of the cell at the corresponding station, indicators in connection with said movable electrodes, an alternating-current generator located in said third conductor, and an inductor device comprising a rotary body connected to the movable electrode at the receiving-station and two normally-balanced conductors adapted to act inductively on said body and rotate it in one direction or the other when the balance between the two circuits formed between said three conductors is destroyed and to be inoperative on said body when the balance is restored, substantially as described.

Signed at 77 Cornhill, in the city of London, England, this 19th day of December, 1898.

ALFRED UPTON ALCOCK.

Witnesses:
EDMUND S. SNEWIN,
WM. O. BROWN.